(12) United States Patent
Venkatasubramanian et al.

(10) Patent No.: US 11,742,662 B2
(45) Date of Patent: Aug. 29, 2023

(54) GRID CONTROL FOR UNKNOWN RESONANCE EVENTS

(71) Applicant: Washington State University, Pullman, WA (US)

(72) Inventors: Vaithianathan Venkatasubramanian, Pullman, WA (US); Yuan Zhi, Kirkland, WA (US); Habib Wajid, Pullman, WA (US)

(73) Assignee: Washington State University, Pullman, WA (US)

( * ) Notice: Subject to any disclaimer, the term of this patent is extended or adjusted under 35 U.S.C. 154(b) by 102 days.

(21) Appl. No.: 17/238,449

(22) Filed: Apr. 23, 2021

(65) Prior Publication Data

US 2021/0336438 A1 Oct. 28, 2021

Related U.S. Application Data

(60) Provisional application No. 63/014,912, filed on Apr. 24, 2020.

(51) Int. Cl.
*H02J 3/18* (2006.01)
*H02J 3/24* (2006.01)
*G05B 19/042* (2006.01)

(52) U.S. Cl.
CPC .............. *H02J 3/18* (2013.01); *G05B 19/042* (2013.01); *H02J 3/242* (2020.01); *G05B 2219/2639* (2013.01)

(58) Field of Classification Search
CPC ... H02J 3/242; H02J 3/18; H02J 3/241; G05B 19/042; G05B 2219/2639; Y02E 40/10; Y02E 40/70; Y02E 60/00; Y04S 10/22
See application file for complete search history.

(56) References Cited

U.S. PATENT DOCUMENTS

| | | | | |
|---|---|---|---|---|
| 5,825,162 | A  * | 10/1998 | Kida ..................... | H02J 3/1807 323/210 |
| 10,886,741 | B1 * | 1/2021 | Chavan ................ | H02J 3/1814 |
| 2012/0200166 | A1 * | 8/2012 | Berggren ............... | H02J 3/242 307/102 |
| 2016/0134114 | A1 * | 5/2016 | Gupta ....................... | H02J 3/01 307/82 |
| 2019/0245458 | A1 * | 8/2019 | Wang .................. | H02M 7/4826 |
| 2021/0194380 | A1 * | 6/2021 | Tamada .................... | H02J 3/16 |

* cited by examiner

*Primary Examiner* — Thomas C Lee
*Assistant Examiner* — Charles Cai
(74) *Attorney, Agent, or Firm* — Barnes & Thornburg LLP (57) ABSTRACT

Technologies for controlling forced oscillations in electrical power grids include a processing unit and a phasor measurement unit and a control device coupled to a power grid. The processing unit receives a measurement indicative of active power in the power grid from the phasor measurement unit and determines a frequency of a forced oscillation active in the power grid based on the measurement. The processing unit injects a corrective signal with the control device into the power grid. The processing unit determines a corrective phase and a corrective amplitude in response to injecting the corrective signal. The processing unit continues to inject the corrective signal with the corrective phase and the corrective amplitude. The control device may be a static VAR compensator, a synchronous generator, a static synchronous compensator, a synchronous condenser, an electric storage device, or a solar power plant. Other embodiments are described and claimed.

20 Claims, 7 Drawing Sheets

GRID CONTROL FOR UNKNOWN RESONANCE EVENTS

CROSS-REFERENCE TO RELATED APPLICATIONS

This application claims priority under 35 U.S.C. § 119(e) to U.S. Provisional Patent Application No. 63/014,912, which was filed on Apr. 24, 2020. The above-referenced patent application is incorporated by reference in its entirety.

BACKGROUND

Power grids may suffer resonant forced oscillations (FO) when control failures or device failures in power plants and system loads result in unintentional sinusoidal injection of power into the power grid. When the frequency of the FO is close to that of system natural modes, resonance can occur leading to the resonant oscillations being felt widely across the power grid. Sustained resonant FO can result in equipment damage and cascading service disruption. Typical grid management practices include attempts to localize and isolate problematic power plant and load components, for example using Supervisory Control and Data Acquisition System (SCADA), distributed PMUs, and phone calls. Such source location is challenging even if wide-area phasor measurement unit (PMU) measurements are available, because the power outputs of many of the non-source power plants and loads will also be exhibiting the oscillations, because of the resonance effect. Additionally, even when the source has been correctly identified, regulatory and practical issues may result in delay in correcting the problem.

SUMMARY

According to one aspect, a processing unit to control forced oscillations (FO) in electrical power grids includes a frequency analyzer, a corrective signal controller, and a corrective signal tuner. The frequency analyzer is to determine an FO frequency of a first forced oscillation (FO) active in a power grid based on a first measurement indicative of active power in the power grid. The corrective signal controller is to inject a corrective signal with the FO frequency, an initial amplitude, and an initial phase into the power grid using a control device. The corrective signal tuner is to determine a corrective phase in response to injection of the corrective signal and determine a corrective amplitude in response to a determination of the corrective phase. The corrective signal controller is further to inject the corrective signal with the FO frequency, the corrective amplitude, and the corrective phase into the power grid using the control device. In an embodiment, the control device may comprise a synchronous generator, a high voltage direct current controller, or a solar power plant.

In an embodiment, the frequency analyzer is further to receive the first measurement from a phasor measurement unit (PMU) or a phase-locked loop (PLL) coupled to the power grid. In an embodiment, to inject the corrective signal with the FO frequency, the initial amplitude, and the initial phase includes to predict the initial phase based on an electrical angle determined based on the first measurement.

In an embodiment, to determine corrective phase in response to the injection of the corrective signal includes to search from the initial phase to the corrective phase that corresponds to a minimum amplitude of the first FO. In an embodiment, to search from the initial phase to the corrective phase includes to increment the corrective phase and measure amplitude of the first FO, decrement the corrective phase and measure amplitude of the first FO, determine a first direction that decreases the amplitude of the first FO in response to an increment of the corrective phase and a decrement of the corrective phase, incrementally adjust the corrective phase in the first direction and measure amplitude of the first FO in response to a determination of the first direction, and determine the corrective phase that corresponds to the minimum amplitude of the first FO in response to incrementally adjustment of the corrective phase. In an embodiment, the corrective signal tuner is further to determine that the amplitude of the first FO is unchanged in response to the increment of the corrective phase and the decrement of the corrective phase, and the corrective signal controller is further to stop the injection of the corrective signal in response to a determination that the amplitude of the first FO is unchanged.

In an embodiment, to determine the corrective amplitude includes to increment the initial amplitude by a predetermined amplitude value, measure amplitude of the first FO in response to an increment of the initial amplitude, and determine the corrective amplitude by linear extrapolation in response to measurement of the amplitude of the first FO.

In an embodiment, to determine the corrective amplitude includes to select a predetermined maximum amplitude associated with the control device. In an embodiment, the corrective signal controller is further to inject a second corrective signal with the FO frequency, the initial amplitude, and the corrective phase into the power grid using a second control device in response to the injection of the corrective signal, the corrective signal tuner is further to determine a second corrective phase in response to injection of the second corrective signal and determine a second corrective amplitude in response to a determination of the second corrective phase, and the corrective signal controller is further to inject the second corrective signal with the FO frequency, the second corrective amplitude, and the second corrective phase into the power grid using the second control device.

According to another aspect, a method to control forced oscillations (FO) in electrical power grids includes determining, by a processing unit, an FO frequency of a first forced oscillation (FO) active in a power grid based on a first measurement indicative of active power in the power grid; determining, by the processing unit, an initial amplitude and an initial phase; injecting, by the processing unit, a corrective signal with the FO frequency, the initial amplitude, and the initial phase into the power grid using a control device; determining, by the processing unit, a corrective phase in response to injecting the corrective signal; determining, by the processing unit, a corrective amplitude in response to determining the corrective phase; and injecting, by the processing unit, the corrective signal with the FO frequency, the corrective amplitude, and the corrective phase into the power grid using the control device.

In an embodiment, determining the corrective phase in response to injecting the corrective signal includes searching from the initial phase to the corrective phase that corresponds to a minimum amplitude of the first FO.

In an embodiment, determining the corrective amplitude includes incrementing the initial amplitude by a predetermined amplitude value; measuring amplitude of the first FO in response to incrementing the initial amplitude; and determining the corrective amplitude by linear extrapolation in response to measuring the amplitude of the first FO.

In an embodiment, determining the corrective amplitude includes selecting a predetermined maximum amplitude associated with the control device. In an embodiment, the method further includes injecting, by the processing unit, a second corrective signal with the FO frequency, the initial amplitude, and the corrective phase into the power grid using a second control device in response to injecting the corrective signal; determining, by the processing unit, a second corrective phase in response to injecting the second corrective signal; determining, by the processing unit, a second corrective amplitude in response to determining the second corrective phase; and injecting, by the processing unit, the second corrective signal with the FO frequency, the second corrective amplitude, and the second corrective phase into the power grid using the second control device.

According to another aspect, one or more computer-readable storage media include a plurality of instructions that, when executed, cause a processing unit to determine an FO frequency of a first forced oscillation (FO) active in a power grid based on a first measurement indicative of active power in the power grid; determine an initial amplitude and an initial phase; inject a corrective signal with the FO frequency, the initial amplitude, and the initial phase into the power grid using a control device; determine a corrective phase in response to injecting the corrective signal; determine a corrective amplitude in response to determining the corrective phase; and inject the corrective signal with the FO frequency, the corrective amplitude, and the corrective phase into the power grid using the control device.

In an embodiment, to determine the corrective phase in response to injecting the corrective signal includes to search from the initial phase to the corrective phase that corresponds to a minimum amplitude of the first FO.

In an embodiment, to determine the corrective amplitude includes to increment the initial amplitude by a predetermined amplitude value; measure amplitude of the first FO in response in incrementing the initial amplitude; and determine the corrective amplitude by linear extrapolation in response to measuring the amplitude of the first FO.

In an embodiment, to determine the corrective amplitude includes to select a predetermined maximum amplitude associated with the control device. In an embodiment, the one or more computer-readable storage media further include a plurality of instructions that, when executed, cause the processing unit to inject a second corrective signal with the FO frequency, the initial amplitude, and the corrective phase into the power grid using a second control device in response to injecting the corrective signal; determine a second corrective phase in response to injecting the second corrective signal; determine a second corrective amplitude in response to determining the second corrective phase; and inject the second corrective signal with the FO frequency, the second corrective amplitude, and the second corrective phase into the power grid using the second control device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
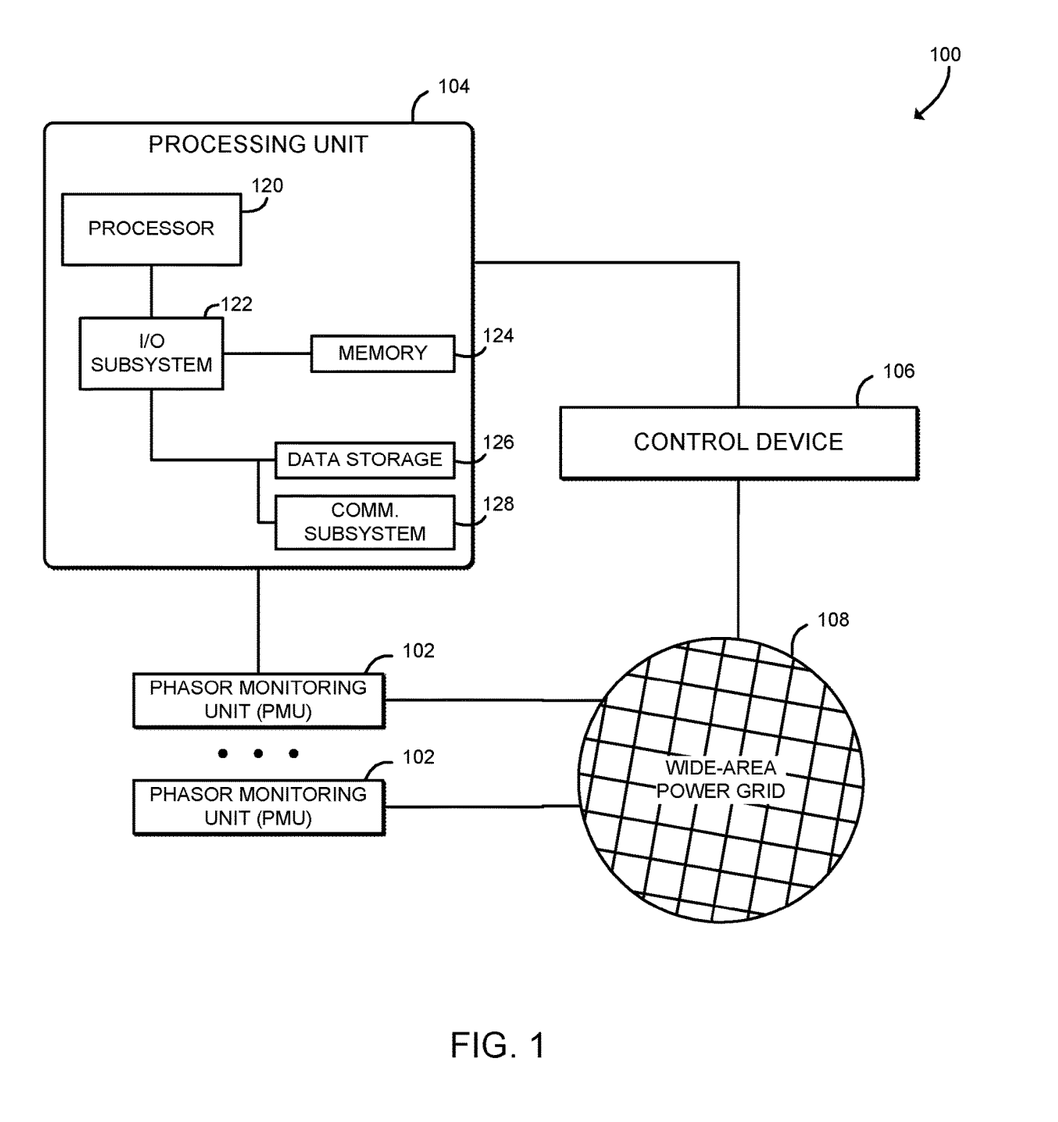
FIG. 1 is a simplified block diagram of at least one embodiment of a system for mitigating forced oscillations in a wide-area power grid.

Referring now to FIG. 1, an illustrative system 100 for mitigating forced oscillations in a wide area power grid includes multiple phasor measurement units (PMUs) 102 in communication with a processing unit 104, one or more control devices 106, and a wide-area power grid 108. In use, and as described further below, the processing unit 104 uses measurements of the power grid 108 produced by the PMUs 102 to detect a forced oscillation of unknown amplitude and location, and further to determine control parameters for a control signal. The control signal is injected into the power grid 108 using the one or more control devices 106. When injected into the power grid 108, the control signal reduces, cancels, or eliminates the forced oscillation. The system processing unit 104 continues monitoring the power grid 108 and iteratively adjusting control parameters, allowing the system 100 to adjust to changing grid condition. Thus, the system 100 may prevent equipment damage and cascading service disruption caused by forced oscillations. Additionally, the system 100 may mitigate forced oscillations without requiring identification or isolation of the source of the forced oscillation. Thus, the system 100 may mitigate forced oscillations more quickly than other approaches requiring identification of the source of the forced oscillation. Indeed, certain interconnected wide area power grids may be too complex to be comprehensively modeled for each possible source of forced oscillation, for example due to the possibility of failure in any one of thousands of controls and devices within the power plants and loads in the system. The system 100 described herein may mitigate forced oscillation for those complex systems without requiring modeling the system or identification of a particular source of the forced oscillation.

When a forced oscillation is resonating with a system mode, the system response, i.e., oscillation shape, may be estimated using Equation 1, below:

$$A_{FR}\angle\Psi_{FR} \approx -\tilde{v}_r \frac{\tilde{w}_r^T b}{\alpha_r - j(\omega_{FO} - \beta_r)} \times \tilde{u} \quad (1)$$

where $A_{FR}\angle\Psi_{FR}$ represents oscillation magnitude and phase angle of each system state; $\tilde{v}_r$ and $\tilde{w}_r$ are right and left eigenvectors corresponding to the system mode $\lambda_r = \alpha_r + j\beta_r$; $\omega_{FO}$ is the forced oscillation (FO) frequency; and $\tilde{u}$ is the vector of phasors at the FO frequency.

The entries in vector $b\tilde{u}$ may indicate the forced oscillation source location as well as the injecting magnitude. Assuming the original FO source $\tilde{u}_i$ is injected into the $i^{th}$ system state at the frequency $\omega_{FO}$, an additional source $\tilde{u}_j$ may be injected at the $j^{th}$ state at the same frequency to minimize the oscillation effect. In this way, then the product $b\tilde{u}$, including the additional source, may be expressed as $b\tilde{u}=[0 \ldots b_i\tilde{u}_i \ldots 0 \ldots b_j\tilde{u}_j \ldots 0]^T$. Therefore, in order to make $\tilde{w}_r^T b\tilde{u}=0$, the additional oscillation magnitude and phase angle should be:

$$\tilde{u}_j = -\frac{\tilde{w}_{ri} b_i \tilde{u}_i}{\tilde{w}_{rj} b_j} \quad (2)$$

where $\tilde{w}_{ri}$ and $\tilde{w}_{rj}$ are the $i^{th}$ and $j^{th}$ entry of vector $\tilde{w}_r$ As described above, for many systems $w_{ri}$, $w_{rj}$, and $u_i$ may be unknown, because the system model is not known for real-time operating conditions and because the forced oscillation input location is unknown. Thus, the system 100 as described herein employs a measurement-based tuned open-loop steady state control to determine control parameters for the control signal to mitigate forced oscillations. Accordingly, the system 100 may mitigate forced oscillations without information regarding the forced oscillation source and the system model.

Referring again to FIG. 1, the processing unit 104 may be embodied as any type of device capable of performing the functions described herein. For example, the processing unit 104 may be embodied as, without limitation, a programmable logic controller, a server, a rack-mounted server, a blade server, a workstation, a network appliance, a web appliance, a microcontroller, a microprocessor, a desktop computer, a laptop computer, a tablet computer, a smartphone, a consumer electronic device, a distributed computing system, a multiprocessor system, and/or any other computing device capable of performing the functions described herein. Additionally, in some embodiments, the processing unit 104 may be embodied as a "distributed controller" or other virtual server formed from multiple computing devices distributed across a network and operating in a public or private cloud. Accordingly, although the processing unit 104 is illustrated in FIG. 1 as embodied as a single computing device, it should be appreciated that the processing unit 104 may be embodied as multiple devices cooperating together to facilitate the functionality described below. As shown in FIG. 1, the illustrative processing unit 104 includes a processor 120, an I/O subsystem 122, memory 124, a data storage device 126, and a communication subsystem 128. Of course, the processing unit 104 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the processing unit 104 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the processing unit 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the processing unit 104, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the processing unit 104 may be embodied as any communication circuit, device, or collection thereof, capable of enabling communications between the processing unit 104, the buyer computing device 104, the seller computing device 108, the marketplace server 108, and/or other remote devices. The communication subsystem 128 may be configured to use any one or more communication technology (e.g., wireless or wired communications) and associated protocols (e.g., Ethernet, Bluetooth®, Wi-Fi®, WiMAX, etc.) to effect such communication.

Each phasor measurement unit (PMU) 102 may be embodied as any electronic sensor device configured to measure magnitude and phase angle of an electrical phasor quantity. For example, the PMUs 102 may measure magnitude and phase angle for voltage, current, or other electrical phasor quantities in the power grid 108. Additionally or alternatively, although illustrated as including multiple PMUs 102, it should be understood that in some embodiments the system 100 may include one or more phase-locked loops (PLLs), syncrophasors, or other devices capable of measuring electrical phasor quantities in the power grid 108.

The control device 106 may be embodied as any device capable of injecting a control signal (i.e., an electrical signal with a particular magnitude, frequency, and phase) into the power grid 108. The control device 106 may be embodied as, without limitation, a static VAR compensator (SVC), a synchronous generator, a high voltage direct current (HVDC) controller, a static synchronous compensator (STATCOM), a synchronous condenser, a thyristor controller series compensator (TCSC), an electric (MW) storage device, a solar power plant, a wind farm controller, or any other device connected to the power grid 108 that can vary any its active power output, its reactive power output, or any combination of its active and reactive power output. Although illustrated as including a single control device 106, in some embodiments the system 100 may include multiple control devices 106.

The power grid 108 may be embodied as any power delivery network or interconnected group of power delivery networks. As such, the power grid 108 may include multiple power plants, loads, transmission lines, busses, and other electrical production, distribution, and consumption equipment. As shown, the PMUs 102 and the control device 106 are connected to the power grid 108.

Figure 2:
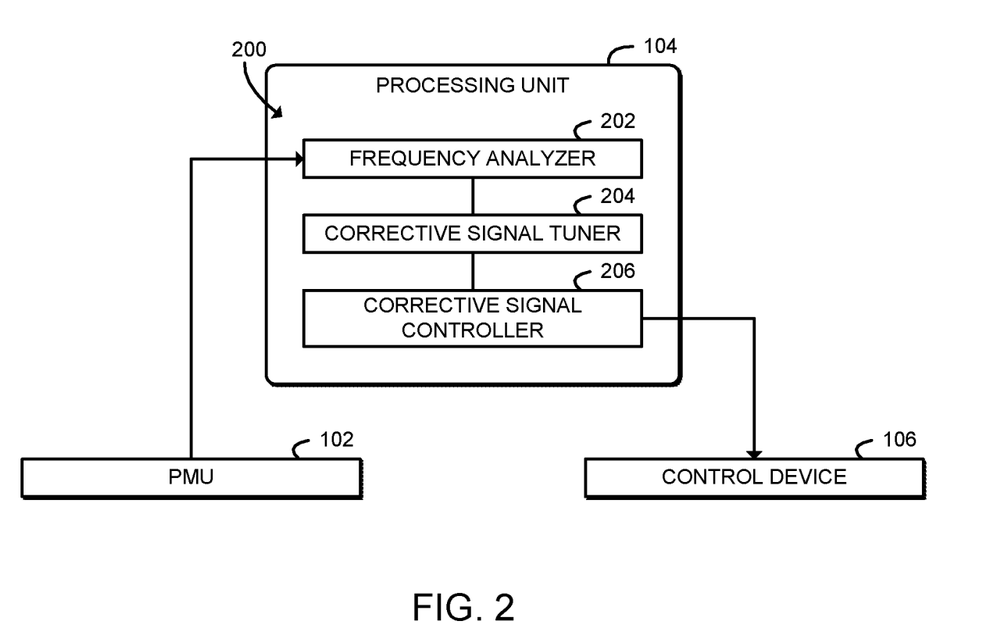
FIG. 2 is a simplified block diagram of an environments that may be established by a processing unit of the system of FIG. 1.

Referring now to FIG. 2, in the illustrative embodiment, the processing unit 104 establishes an environment 200 during operation. The illustrative environment 200 includes a frequency analyzer 202, a corrective signal tuner 204, and a corrective signal controller 206. The various components of the environment 200 may be embodied as hardware, firmware, software, or a combination thereof. As such, in some embodiments, one or more of the components of the environment 200 may be embodied as circuitry or a collection of electrical devices (e.g., frequency analyzer circuitry 202, corrective signal tuner circuitry 204, and/or corrective signal controller circuitry 206). It should be appreciated that, in such embodiments, one or more of those components may form a portion of the processor 120, the I/O subsystem 122, and/or other components of the processing unit 104.

The frequency analyzer 202 is configured to determine an FO frequency of a forced oscillation (FO) active in the power grid 108 based on a measurement indicative of active power in the power grid. The frequency analyzer 202 may be further configured to receive the measurement from a phasor measurement unit (PMU) 102 coupled to the power grid 108 or a phase-locked loop (PLL) coupled to the power grid 108. In some embodiments, determining the FO frequency based on the measurement may include performing a fast Fourier transform based on the measurement.

The corrective signal controller 206 is configured to inject a corrective signal with the FO frequency, an initial amplitude, and an initial phase into the power grid 108 using a control device 106. Injecting the corrective signal may include predicting the initial phase based on an electrical angle determined based on the measurement. The corrective signal controller 206 is further configured to inject a corrective signal with the FO frequency, a corrective amplitude, and a corrective phase into the power grid 108 using the control device 106.

The corrective signal tuner 204 is configured to determine the corrective phase in response to injecting the corrective signal and to determine the corrective amplitude in response to determining the corrective phase. Determining the corrective phase may include searching from the initial phase to the corrective phase that corresponds to a minimum amplitude of the FO. Searching from the initial phase to the corrective phase may include incrementing the corrective phase and measuring amplitude of the FO, decrementing the corrective phase and measuring amplitude of the FO, determining which direction decreases the amplitude of the FO in response to incrementing and decrementing the corrective phase, incrementally adjusting the corrective phase in that direction and measuring amplitude of the FO; and determining the corrective phase that corresponds to the minimum amplitude of the FO in response to incrementally adjusting the corrective phase. Determining the corrective amplitude may include incrementing the initial amplitude by a predetermined amplitude value, measuring amplitude of the FO in response to incrementing the initial amplitude, and determine the corrective amplitude by linear extrapolation in response to measuring the amplitude of the FO.

The corrective signal tuner 204 may be further configured to determine that the amplitude of the FO is unchanged in response to incrementing and decrementing the corrective phase, and the corrective signal controller 206 may be further configured to stop injecting the corrective signal in response to determining that the amplitude of the FO is unchanged.

In some embodiments, determining the corrective amplitude may include selecting a predetermined maximum amplitude associated with the control device 106. In some embodiments, the corrective signal controller 106 may be further configured to inject an additional corrective signal with the FO frequency, the initial amplitude, and the corrective phase into the power grid 108 using an additional control device 106. In those embodiments, the corrective signal tuner 204 is further configured to determine an additional corrective phase in response to injection of the additional corrective signal, and to determine an additional corrective amplitude in response to determining the additional corrective phase. The corrective signal controller 206 is further configured to inject the additional corrective signal with the FO frequency, the additional corrective amplitude, and the additional corrective phase into the power grid using the additional control device 106.

Figure 3:
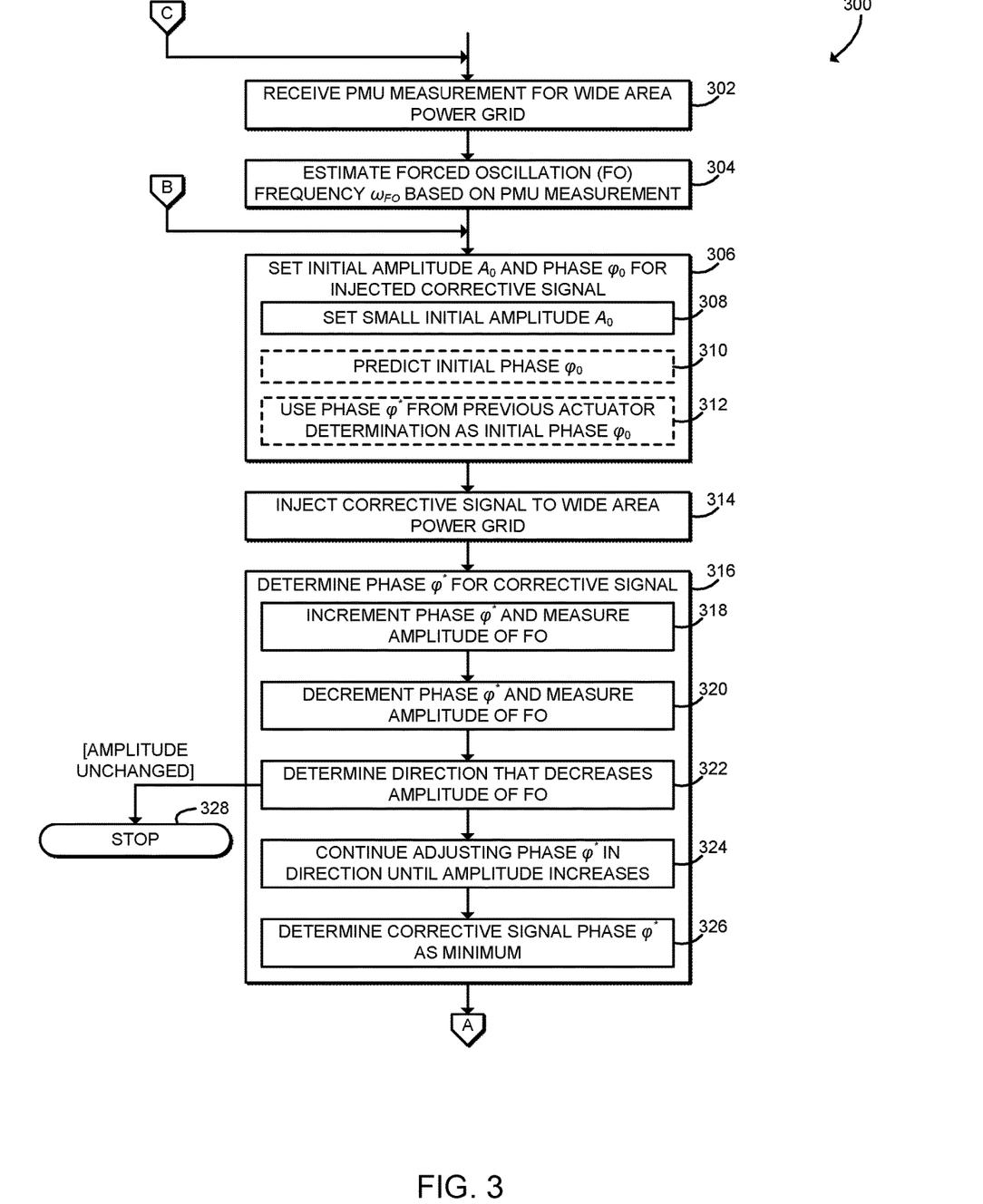
FIGS. 3 and 4 are a simplified flow diagram of at least one embodiment of a method for mitigating forced oscillations that may be executed by the processing unit of FIGS. 1 and 2.
Figure 4:
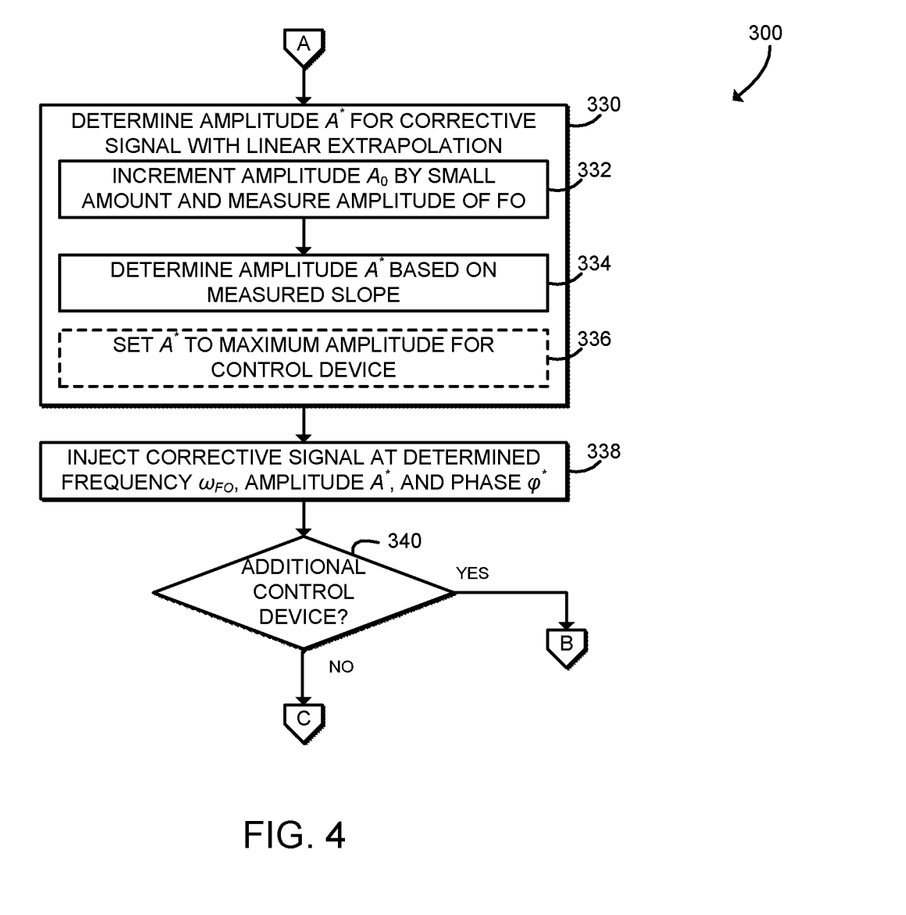

Referring now to FIGS. 3-4, in use, the processing unit 104 may execute a method 300 for mitigating forced oscillations in the power grid 108. It should be appreciated that, in some embodiments, the operations of the method 300 may be performed by one or more components of the environment 200 of the processing unit 104 as shown in FIG. 2. The method 300 begins with block 302, in which the processing unit 104 receives one or more PMU 102 measurements for the wide area power grid 102. The PMU 102 measurement may be embodied as voltage measurements, current measurements, power measurements, or any other measures of a phasor quantity in the power grid 108. The PMU 102 measurement may also measure the phasor quantity over a predetermined time period. For example, processing unit 104 may receive measurement data corresponding to 30 seconds of measurement.

In block 304, the processing unit 104 estimates a forced oscillation frequency $\omega_{FO}$ based on the PMU measurements. The processing unit 104 may, for example, perform a fast Fourier transform (FFT), determine a power spectral density (PSD) peak, perform Prony's method of signal analysis, or perform any other appropriate analysis to identify the frequency of a forced oscillation in the power grid 108. For non-sinusoidal forced oscillations (e.g., sawtooth oscillations or other non-sinusoidal waveforms), certain harmonic frequencies may resonate with poorly damped system modes in addition to the fundamental-resonant component. In those embodiments, the processing unit 104 may repeat the forced oscillation control method 300 for those harmonic frequencies, in some embodiments using additional control devices 106. Similarly, the method 300 may handle scenarios in which the FO resonates with more than one non-distinct system mode.

In block 306, the processing unit 104 determines an initial amplitude $A_0$ and an initial phase $\varphi_0$ for a corrective signal u to be injected into the power grid 108. In block 308, the processing unit 104 sets the initial amplitude $A_0$ as a small value. For example, in an embodiment the initial amplitude $A_0$ may be set to 2 MW.

In some embodiments, in block 310 the processing unit 104 may predict the initial phase $\varphi_0$. The processing unit 104 may predict the initial phase $\varphi_0$ using measurement of the power grid 108 and an offline system small-signal model of the power grid 108. The off-line model may not have to be particularly accurate, and small discrepancies between the model and any system changes may still allow the processing unit 104 to make a reasonable estimate of initial phase $\varphi_0$ for the mitigation control algorithm. Based on Equation 1, above, for a source of FO at i, for any measured quantity $\tilde{y}_k$:

$$\tilde{y}_k \approx -C\tilde{v}_r \frac{\tilde{w}_{ri} b_i \tilde{u}_i}{\alpha_r - j(\omega_{FO} - \beta_r)} \quad (3)$$

provided, D=O. Where, $C \in \mathbb{R}^{1 \times n}$ is the output matrix and $D \in \mathbb{R}^{1 \times 1}$ is the feedforward matrix. Null feedthrough is a fair assumption and can be ensured in real systems by appropriately choosing the control location. The proposed expected control is:

$$\tilde{w}_{rj} b_j \tilde{u}_j = -\tilde{w}_{ri} b_i \tilde{u}_i \quad (4)$$

$$\tilde{y}_k \approx -C\tilde{v}_r \frac{-\tilde{w}_{rj} b_j \tilde{u}_j}{\alpha_r - j(\omega_{FO} - \beta_r)} \quad (5)$$

$$\tilde{u}_j \approx \tilde{y}_k \times (\alpha_r - j(\omega_{FO} - \beta_r))/C\tilde{v}_r \tilde{w}_{rj} b_j \quad (6)$$

As indicated in Equation 6, above, mitigation control may thus be predominately a function of control bus location parameters and the measurement used for the controller. Accordingly, an approximate estimate of mitigation control, including initial phase $\varphi_0$ and initial amplitude $A_0$ can be made using a measurement and off-line model. The correction against any measurement, to estimate the mitigation control may also be estimated by adding a FO source in a known location, in a simulation or a real system, and finding the displacement of mitigation control from a certain measurement. Because the correction factor is solely a function of control bus parameters, it may remain the same for unknown FO source locations as well. Additionally or alternatively, in some embodiments, instead of performing a prediction, the processing unit 104 may assume that the initial phase $\varphi_0$ is zero.

In some embodiments, in block 312, the processing unit 104 may set the initial phase $\varphi_0$ to a corrective phase $\varphi^*$ that was previously determined for a control device 106. For example, and as described further below in connection with block 340, in some embodiments the processing unit 140 may use multiple control devices 106 to mitigate forced oscillations. In those embodiments, a corrective signal u for each control device 106 may be determined iteratively, and the corrective phase $\varphi^*$ determined for a control device 106 may be used as the initial phase $\varphi_0$ for the next control device 106.

In block 314, the processing unit 104 injects the control signal u having the initial amplitude $A_0$, the initial phase $\varphi_0$, and the forced oscillation frequency $\omega_{FO}$ into the power grid 108. The processing unit 104 may, for example, control or otherwise cause the control device 106 to inject the control signal u into the power grid 108.

In block 316, while injecting the corrective signal u, the processing unit 104 determines a corrective phase $\varphi^*$ for the corrective signal u. To determine the corrective phase $\varphi^*$, the processing unit 104 performs a gradient-based search starting from the initial phase $\varphi_0$ for the phase $\varphi^*$ that corresponds to a minimum amplitude of the FO. In block 318, the processing unit 104 increments the current phase $\varphi^*$ by $\Delta\varphi$ and measures the resulting amplitude of the FO. In block 320, the processing unit 104 decrements the current phase $\varphi^*$ by $\Delta\varphi$ and measures the resulting amplitude of the FO. In block 322, the processing unit 104 determines which direction (e.g., increasing or decreasing) phase $\varphi^*$ decreases the corresponding amplitude of the FO. In block 324, the processing unit 104 continues incrementally adjusting the phase $\varphi^*$ in the determined direction until the amplitude of the FO increases. In block 326, the processing unit 104 determines the corrective phase $\varphi^*$ that corresponds to the minimum amplitude of the FO. For example, the processing unit 104 may employ a bisection method using two values of $\varphi$ around the minima to find the optimal phase $\varphi^*$. As another example, the processing unit 104 may use a middle point (half interval) algorithm to iterate between $\varphi_k$ and $\varphi_{k+1}$, positioned on opposite sides of the minimum, to find the minimum value for $\varphi$ to a specified accuracy.

Referring back to block 322, if the processing unit 104 determines that the amplitude of the FO is unchanged when increasing or decreasing the corrective phase $\varphi^*$, the method 300 branches to block 328. When the source of the FO is removed from the system while mitigation control is active, the amplitude of system response to mitigation control becomes independent of the angle of control. Thus, when the amplitude of the FO remains unchanged when increasing or decreasing the corrective phase $\varphi^*$, this indicates that the source of the FO has been removed from the power grid 108. Thus, in block 328, the processing unit 104 stops injecting the corrective signal u into the power grid 108, and the method 300 is completed. The method 300 may be executed again to monitor for changing grid conditions.

Referring again to block 316, after determining the corrective phase $\varphi^*$ as described above, the method 300 proceeds to block 330, shown in FIG. 4. In block 330, the processing unit 104 determines a corrective amplitude A* for the corrective signal u using linear extrapolation. In block 332, the processing unit 104, while continuing to inject the corrective signal u with the frequency $\omega_{FO}$ and the corrective phase $\varphi^*$, increments the amplitude $A_0$ by a small amount $\Delta A$. After incrementing the amplitude, the processing unit 104 measures amplitude of the FO. In block 334, the processing unit 104 determines the corrective amplitude A* based on the measured slope. For example, the processing unit 104 may determine the corrective amplitude A* required to reduce amplitude of the FO to zero, based on the measured reduction in amplitude of the FO when incrementing amplitude $A_0$ of the corrective signal u. In some embodiments, in block 336, the processing unit 104 may set the corrective amplitude A* to a maximum amplitude associated with a control device 106. The maximum amplitude may be embodied as, for example, a saturation limit for which the control device 106 may operate in a linear region. Of course, in other embodiments the maximum amplitude may be an allocated capacity or any other limit associated with the control device 106. The processing unit 104 may set the corrective amplitude A* to the maximum amplitude when the amplitude required to drive amplitude of the FO to zero exceeds the maximum amplitude. In those embodiments, the processing unit 104 may continue to apply additional corrective signals u using one or more additional control devices 106, as described further below.

In block 338, the processing unit 104 injects the control signal u having the corrective amplitude A*, the corrective phase $\varphi^*$, and the forced oscillation frequency $\omega_{FO}$ into the power grid 108. The processing unit 104 may, for example, control or otherwise cause the control device 106 to inject the control signal u into the power grid 108.

In block 340, the processing unit 104 determines whether to use an additional control device 106 to mitigate forced oscillations. The processing unit 104 may use additional control devices, for example, when the amplitude of corrective signal u required to mitigate FO would exceed the maximum amplitude available from a single control device 106. If the processing unit 104 determines to use an additional control device 106, the method 300 loops back to block 306, shown in FIG. 3, to determine signal parameters for an additional corrective signal u for the additional control device 106. Referring back to block 340, if the processing unit 104 determines not to use an additional control device 106, the method 300 loops back to block 302, shown in FIG. 3, in which the processing unit 104 may continue to monitor the power grid 108 and adapt to changing grid conditions.

Figure 5:
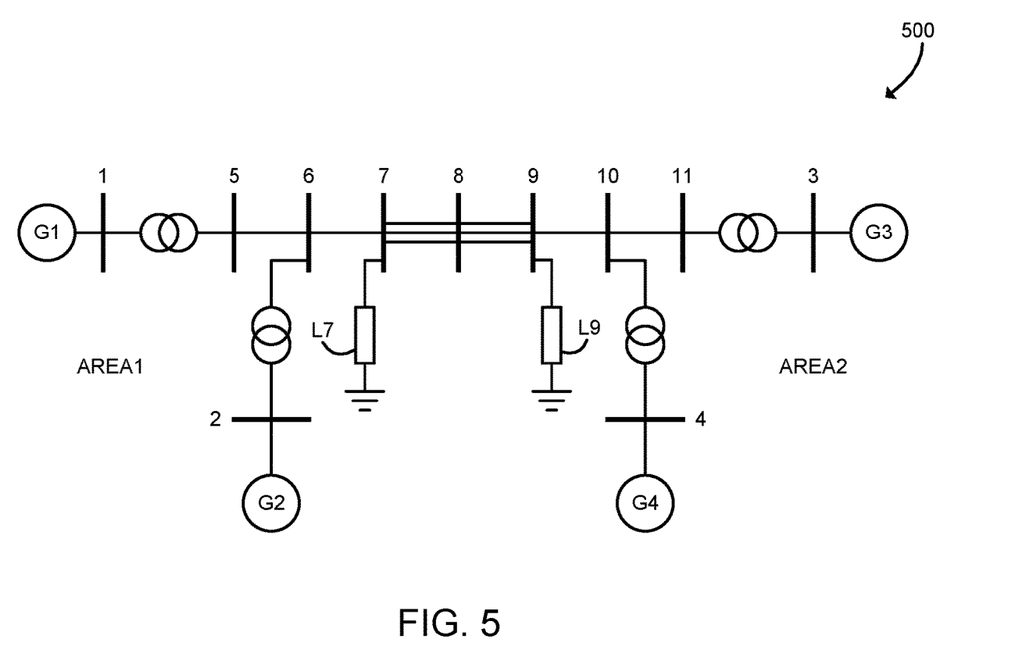
FIG. 5 is a schematic diagram of an illustrative test power grid.

Referring now to FIG. 5, schematic diagram 500 illustrates an 11-bus system that may be illustratively used with the system 100 as an example of the method 300 in use. The system 500 may be simulated, for example using the Transient Security Assessment Tool (TSAT) provided by DSA-Tools. As shown, the system 500 includes two areas having 11 busses, four generators G1 through G4, and two loads L7 and L9. In the illustrative example, a source of low-frequency forced oscillation (FO) is introduced at generator four, in the form of periodic variation in the governor reference. This simulates the condition where the FO is injected into the system due to torsional vibrations in the generator shaft. Mitigation control (e.g., the signal generated by the control device 106) is illustrative applied to bus 1 (e.g., through governor reference of generator one). Measurements (e.g., PMU measurement 102) is measured through the tie-line flow between bus 7 and bus 8. It should be understood that in other embodiments, any other measurement of the system 500 may be used.

Figure 6:
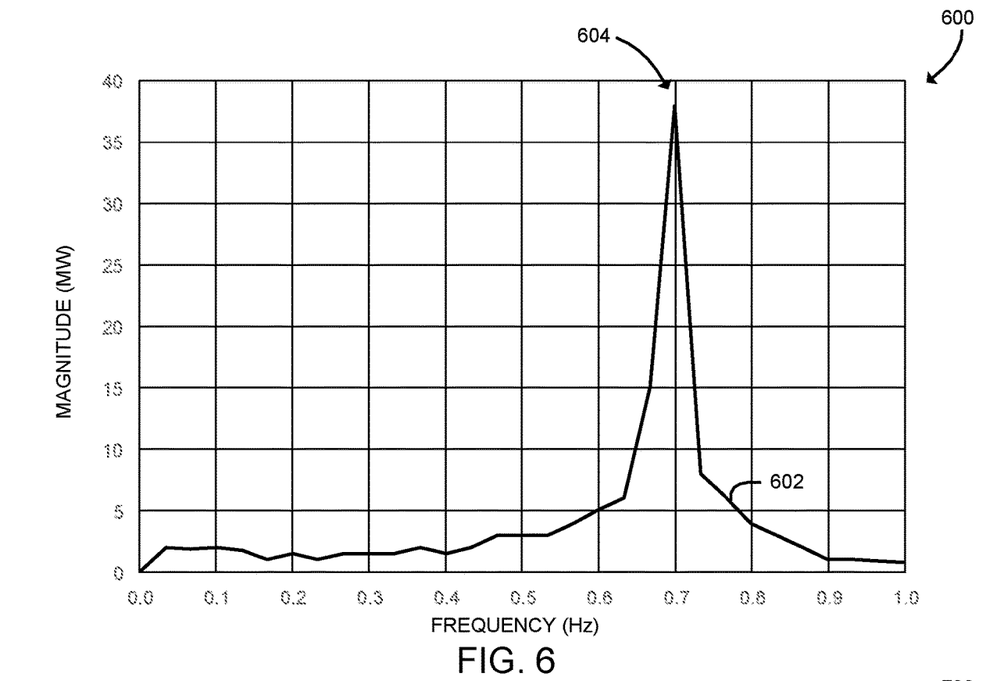
FIGS. 6-8 are plots illustrating test results that may be achieved by the processing unit of FIGS. 1-4 with the test power grid of FIG. 5.

As described above in connection with blocks 302 and 304 of FIG. 3, the processing unit 104 determines the frequency $\omega_{FO}$ based on measurements of the tie-line flow. Referring now to FIG. 6, plot 600 illustrates results of a fast Fourier transform (FFT) analysis of the measurement data. Curve 602 illustrates magnitude in MW against frequency in Hz. As shown, the processing unit 104 detected a peak 604 at about 37 MW and at about 0.7 Hz.

Figure 7:
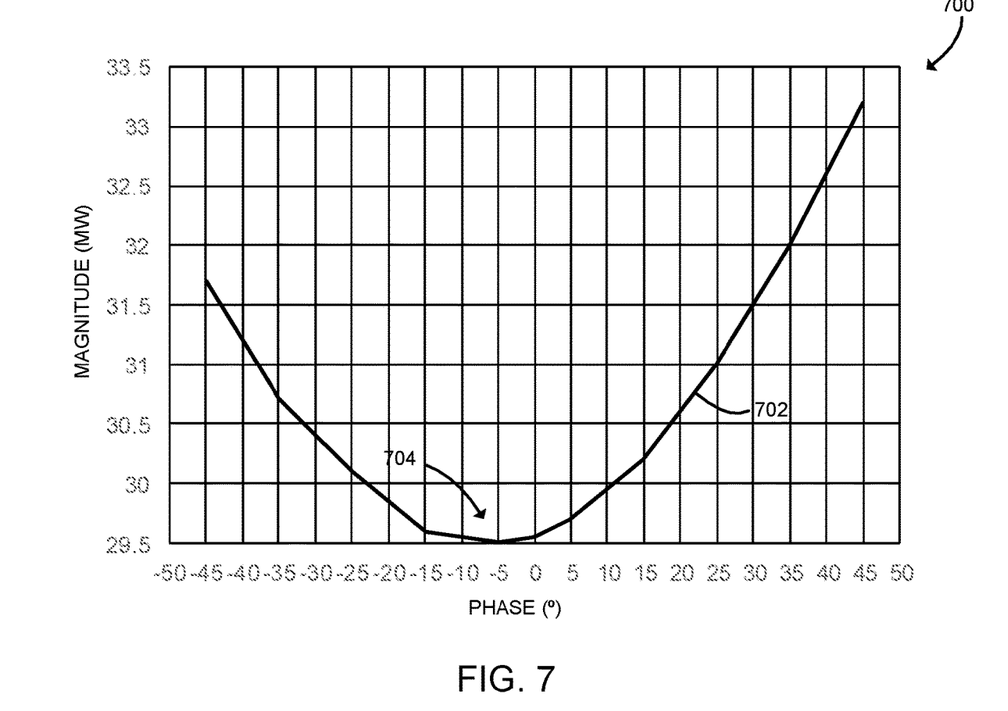

As described above in connection with blocks 306, 314, 316 of FIG. 3, the processing unit 104 injects a corrective signal u starting with initial control parameters and then iteratively adjust the control parameters to determine a corrective phase $\varphi^*$ for the corrective signal u. Referring now to FIG. 7, plot 700 illustrates magnitude of FO against phase angle of the applied corrective signal u measured in the system 500. Curve 702 illustrates amplitude of the FO, and minimum 704 represents an optimal phase angle $\varphi_0$. In the illustrative example, the initial phase $\varphi_0$ is zero, the initial amplitude $A_0$ is 2 MW, and $\Delta\varphi$ is five degrees. Illustratively, the measured FO magnitude for a phase equal to zero is about 29.6 MW. The measured FO magnitude for a phase equal to −5° is about 29.5 MW, and the measured FO magnitude for a phase equal to 5° is about 29.7 MW. Therefore, the processing unit 104 may start searching for optimal phase $\varphi^*$ in the negative direction. The measured FO magnitude for a phase equal to −10° is about 29.6. Therefore, in the illustrative example, the processing unit 104 may stop searching and determine that the corrective phase $\varphi^*$ is −5°.

As described above in connection with block 330 of FIG. 4, the processing unit 104 determines the corrective amplitude A* using linear extrapolation. As described above, in the illustrative embodiment, for an initial amplitude $A_0$ of the corrective signal u equal to 2 MW, the measured FO amplitude is 29.50 MW. In the illustrative example, when amplitude of the corrective signal u is increased to 4 MW, the measured FO amplitude is 21.48 MW. Based on those values, amplitude of the control signal u may be determined using Equation 3, below, to be 9.30 MW.

$$4 + \frac{21.48}{(29.50 - 21.48)/2} = 9.30 \text{ MW} \tag{7}$$

Figure 8:
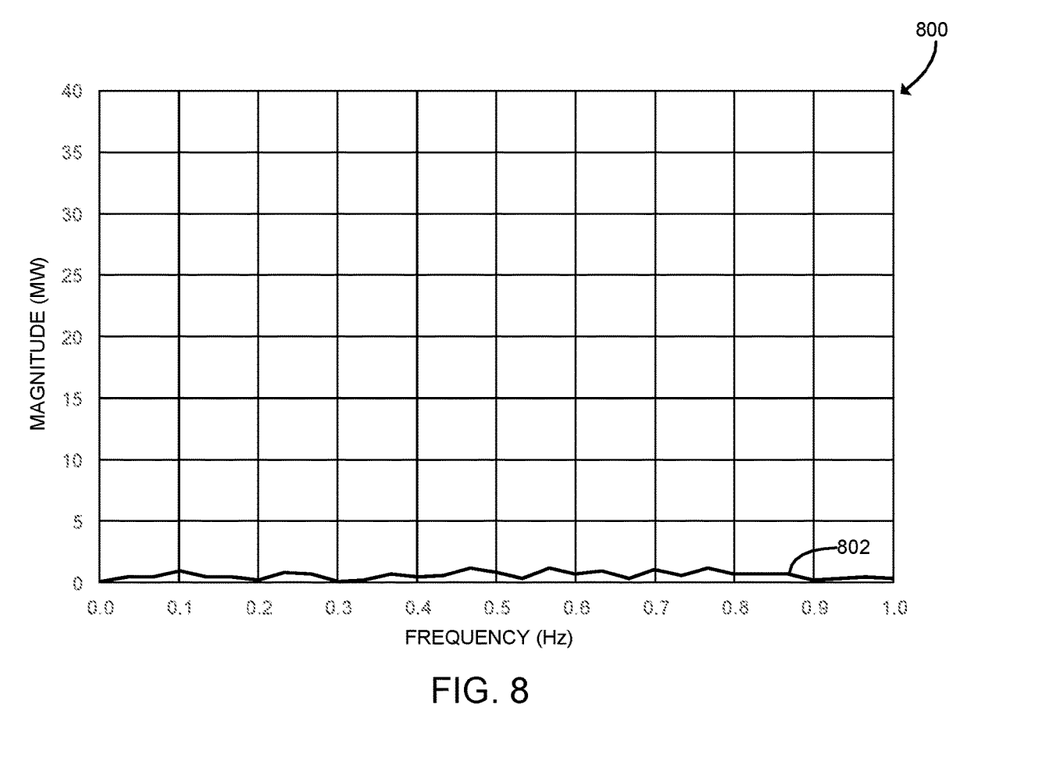

As described above in connection with block 338 of FIG. 4, the resulting corrective signal u with corrective amplitude A*=9.30 MW and corrective phase $\varphi^*$=−5° is applied to the system 500 using a control device 106. Referring now to FIG. 8, plot 800 illustrates results of a fast Fourier transform (FFT) analysis of measurement data from the PMU 102 after application of the corrective signal u. Curve 802 illustrates magnitude in MW against frequency in Hz. As shown, the peak associated with the FO at 0.7 Hz has been canceled out by the corrective signal u.

As described above, in some embodiments the processing unit 104 may use multiple control devices 106 to mitigate the FO. As an example, in an embodiment a control device 106 may have a maximum amplitude of 5 MW. Continuing the above example, the corrective amplitude A*=9.30 MW is larger than the maximum amplitude of 5 MW. In that embodiment, the processing unit 104 may cause the control device 106 to inject a corrective signal $u_1$ with an amplitude of 5 MW and a corrective phase $\varphi^*$=−5°. While injecting the corrective signal $u_1$, the processing unit 104 uses an additional control device 106 to inject another control signal $u_2$. The processing unit 104 searches for control parameters $A^*$ and $\varphi^*$ for the control signal $u_2$ as described above in connection with blocks 306 through 330 of FIGS. 3-4. As described above, the corrective phase $\varphi^*=-5°$ may be used as the initial phase $\varphi_0$ when searching for the control parameters of the control signal $u_2$. In addition to allowing mitigation of signals beyond the allocated capacity of a single control device 106, using multiple control devices 106 may provide increased error tolerance of the proposed control. In particular, any error in phase angle of a control device 106 may be removed by other control devices 106 to make net error in the system zero. Additionally, although illustrated an described as using two control devices 106, it should be understood that the techniques disclosed herein may be extended to work with any number of control devices 106.

As another example, the method 300 may be applied to the Western Electricity Coordinating Council (WECC) system, with simulations performed in Small Signal Analysis Tool (SSAT) and TSAT provided by DSATools. In the illustrative example, a source of FO is introduced at generator bus 36148, in form of periodic variation of magnitude 0.01 pu and frequency 0.2692 Hz, in the governor reference. This will simulate the condition where FO are injected into the system due to torsional vibrations in a generator shaft. Mitigation control (i.e., a control device 106) is applied through governor reference of a generator at bus 20124. The PMU 102 measures tie-line flow, $P_{TIE}$, between bus 26286 and bus 20083, which is one of the California-Oregon Interface (COI) lines.

As described above in connection with blocks 302 and 304 of FIG. 3, the processing unit 104 determines the frequency $\omega_{FO}$ based on measurements of the tie-line flow. Illustratively, the processing unit 104 detects an oscillation with frequency $\omega_{FO}$ equal to 0.2692 Hz and magnitude of 25.8 MW in the $P_{TIE}$ signal. As described above in connection with blocks 306, 314 of FIG. 3, the processing unit 104 injects a corrective signal at generator bus 20124 with initial magnitude $A_0=0.005$ pu and initial phase $\varphi_0=135°$. As described above in connection with block 316 of FIG. 3, the processing unit 104 searches for corrective phase $\varphi^*$ using $\Delta\varphi=5°$. Each iteration of the search, including measurements of FO magnitude, are shown in Table 2, below. As shown, the search determines that phase has a minimum between 155° and 160°. Applying the bisection method around the minima, the corrective phase $\varphi^*$ is determined to be 156°, with $P_{TIE}$ at that angle equal to 33.86 MW p-p. Next, as described above in connection with block 330 of FIG. 4, the processing unit 104 increments the amplitude of the corrective signal by 0.005 pu, which causes the tie-line flow to reduce to 16.87 MW. Using linear extrapolation, the processing unit determines that the amount of control signal required to completely reject the FO is 0.0149. Thus, in the illustrative example, the corrective signal u has frequency $\omega_{FO}=0.2692$ Hz, corrective amplitude $A^*=0.0149$ pu, and corrective phase $\varphi^*=156°$.

TABLE 2

Phase angle search steps.

| $\varphi^*$ (Degrees) | FO Magnitude (MW) | 1-D Minima Search |
|---|---|---|
| 135 | 18.33 | Initialize |
| 130 | 18.73 | Flip |
| 140 | 18.02 | Continue |
| 145 | 17.80 | Continue |
| 150 | 17.67 | Continue |

TABLE 2-continued

Phase angle search steps.

| $\varphi^*$ (Degrees) | FO Magnitude (MW) | 1-D Minima Search |
|---|---|---|
| 155 | 17.68 | Continue |
| 160 | 17.80 | Stop |

The invention claimed is:

1. A processing unit for open-loop mitigation of forced oscillations (FO) in electrical power grids, the processing unit comprising:
   a frequency analyzer to determine an FO frequency of a first FO active in a power grid based on a first measurement indicative of an active power in the power grid;
   a corrective signal controller to (i) receive the FO frequency and (ii) inject an initial corrective signal with the FO frequency, an initial amplitude, and an initial phase into the power grid using a control device, wherein the control device comprises an additional source coupled to the power grid at a first control site; and
   a corrective signal tuner in an open-loop configuration to (i) determine a corrective phase from a steady-state response to the injection of the initial corrective signal and (ii) determine a corrective amplitude from a steady-state response to the determination of the corrective phase;
   wherein the corrective signal controller is further to (i) inject a refined corrective signal with the FO frequency, the initial amplitude, and the corrective phase into the power grid using the control device in response to the determination of the corrective phase, and (ii) inject a corrective signal with the FO frequency, the corrective amplitude, and the corrective phase into the power grid using the control device in response to the determination of the corrective amplitude.

2. The processing unit of claim 1, wherein the control device comprises a synchronous generator, a high voltage direct current controller, or a solar power plant.

3. The processing unit of claim 1, wherein the frequency analyzer is further to receive the first measurement from a phasor measurement unit (PMU) or a phase-locked loop (PLL) coupled to the power grid.

4. The processing unit of claim 1, wherein the to inject the initial corrective signal with the FO frequency, the initial amplitude, and the initial phase comprises to predict the initial phase based on an electrical angle determined based on the first measurement.

5. The processing unit of claim 1, wherein the to determine the corrective phase in response to the injection of the initial corrective signal comprises to search from the initial phase to the corrective phase that corresponds to a minimum amplitude of the first FO.

6. The processing unit of claim 5, wherein the to search from the initial phase to the corrective phase comprises to:
   increment the corrective phase and measure a first resulting amplitude of the first FO;
   decrement the corrective phase and measure a second resulting amplitude of the first FO;
   determine a first direction that decreases the amplitude of the first FO in response to the increment of the corrective phase and the decrement of the corrective phase based on the first resulting amplitude and the second resulting amplitude;
incrementally adjust the corrective phase in the first direction and measure the amplitude of the first FO in response to the determination of the first direction; and
determine the corrective phase that corresponds to the minimum amplitude of the first FO in response to the incremental adjustment of the corrective phase.

7. The processing unit of claim 6, wherein:
the corrective signal tuner is further to determine that the amplitude of the first FO is unchanged in response to the increment of the corrective phase and the decrement of the corrective phase based on the first resulting amplitude and the second resulting amplitude; and
the corrective signal controller is further to stop the injection of the initial corrective signal in response to the determination that the amplitude of the first FO is unchanged.

8. The processing unit of claim 1, wherein the to determine the corrective amplitude comprises to:
increment the initial amplitude by a predetermined amplitude value;
measure an amplitude of the first FO in response to the increment of the initial amplitude; and
determine the corrective amplitude by a linear extrapolation in response to the measurement of the amplitude of the first FO.

9. The processing unit of claim 1, wherein the to determine the corrective amplitude comprises to select a predetermined maximum amplitude associated with the control device.

10. The processing unit of claim 9, wherein:
the corrective signal controller is further to inject a second corrective signal with the FO frequency, the initial amplitude, and the corrective phase into the power grid using a second control device in response to the injection of the corrective signal;
the corrective signal tuner is further to (i) determine a second corrective phase in response to the injection of the second corrective signal and (ii) determine a second corrective amplitude in response to the determination of the second corrective phase; and
the corrective signal controller is further to inject the second corrective signal with the FO frequency, the second corrective amplitude, and the second corrective phase into the power grid using the second control device.

11. A method for open-loop mitigation of forced oscillations (FO) in electrical power grids, the method comprising:
determining, by a processing unit, an FO frequency of a first FO active in a power grid based on a first measurement indicative of an active power in the power grid;
determining, by the processing unit, an initial amplitude and an initial phase;
injecting, by the processing unit, an initial corrective signal with the FO frequency, the initial amplitude, and the initial phase into the power grid using a control device, wherein the control device comprises an additional source coupled to the power grid at a first control site;
determining, by the processing unit, a corrective phase in from a steady-state response to the injecting the initial corrective signal;
injecting, by the processing unit, a refined corrective signal with the FO frequency, the initial amplitude, and the corrective phase into the power grid using the control device in response to the determining the corrective phase;
determining, by the processing unit, a corrective amplitude from a steady-state response to the injecting the refined corrective signal; and
injecting, by the processing unit, a corrective signal with the FO frequency, the corrective amplitude, and the corrective phase into the power grid using the control device in response to the determining the corrective amplitude.

12. The method of claim 11, wherein the determining the corrective phase in response to the injecting the initial corrective signal comprises searching from the initial phase to the corrective phase that corresponds to a minimum amplitude of the first FO.

13. The method of claim 11, wherein the determining the corrective amplitude comprises:
incrementing the initial amplitude by a predetermined amplitude value;
measuring an amplitude of the first FO in response to the incrementing the initial amplitude; and
determining the corrective amplitude by a linear extrapolation in response to the measuring the amplitude of the first FO.

14. The method of claim 11, wherein the determining the corrective amplitude comprises selecting a predetermined maximum amplitude associated with the control device.

15. The method of claim 14, further comprising:
injecting, by the processing unit, a second corrective signal with the FO frequency, the initial amplitude, and the corrective phase into the power grid using a second control device in response to the injecting the corrective signal;
determining, by the processing unit, a second corrective phase in response to the injecting the second corrective signal;
determining, by the processing unit, a second corrective amplitude in response to the determining the second corrective phase; and
injecting, by the processing unit, the second corrective signal with the FO frequency, the second corrective amplitude, and the second corrective phase into the power grid using the second control device.

16. One or more non-transitory, computer-readable storage media comprising a plurality of instructions that, when executed, cause a processing unit to:
determine an FO frequency of a first forced oscillation (FO) active in a power grid based on a first measurement indicative of an active power in the power grid;
determine an initial amplitude and an initial phase;
inject an initial corrective signal with the FO frequency, the initial amplitude, and the initial phase into the power grid using a control device, wherein the control device comprises an additional source coupled to the power grid at a first control site;
determine a corrective phase from a steady-state response to the injecting the initial corrective signal;
inject a refined corrective signal with the FO frequency, the initial amplitude, and the corrective phase into the power grid using the control device in response to the determining the corrective phase;
determine a corrective amplitude from a steady-state response to the injecting the refined corrective signal; and
inject a corrective signal with the FO frequency, the corrective amplitude, and the corrective phase into the power grid using the control device in response to the determining the corrective amplitude.

17. The one or more non-transitory, computer-readable storage media of claim 16, wherein the to determine the corrective phase in response to the injecting the initial corrective signal comprises to search from the initial phase to the corrective phase that corresponds to a minimum amplitude of the first FO.

18. The one or more non-transitory, computer-readable storage media of claim 16, wherein the to determine the corrective amplitude comprises to:
 increment the initial amplitude by a predetermined amplitude value;
 measure an amplitude of the first FO in response to the incrementing the initial amplitude; and
 determine the corrective amplitude by a linear extrapolation in response to the measuring the amplitude of the first FO.

19. The one or more non-transitory, computer-readable storage media of claim 16, wherein the to determine the corrective amplitude comprises to select a predetermined maximum amplitude associated with the control device.

20. The one or more non-transitory, computer-readable storage media of claim 19, further comprising a plurality of instructions that, when executed, cause the processing unit to:
 inject a second corrective signal with the FO frequency, the initial amplitude, and the corrective phase into the power grid using a second control device in response to injecting the corrective signal;
 determine a second corrective phase in response to the injecting the second corrective signal;
 determine a second corrective amplitude in response to determining the second corrective phase; and
 inject the second corrective signal with the FO frequency, the second corrective amplitude, and the second corrective phase into the power grid using the second control device.

* * * * *